United States Patent
Haymond et al.

(10) Patent No.: US 9,436,644 B1
(45) Date of Patent: Sep. 6, 2016

(54) APPARATUS AND METHOD FOR OPTIMIZING USB-OVER-IP DATA TRANSACTIONS

(71) Applicant: Teradici Corporation, Burnaby (CA)

(72) Inventors: Richard Dean Haymond, Vancouver (CA); Michael James Smith, Vancouver (CA); Haw-Yuan Yang, Richmond (CA); Daniel Michael Apperloo, Chilliwack (CA)

(73) Assignee: Teradici Corporation, Burnaby, British Columbia (CA)

( * ) Notice: Subject to any disclaimer, the term of this patent is extended or adjusted under 35 U.S.C. 154(b) by 118 days.

(21) Appl. No.: 14/568,565

(22) Filed: Dec. 12, 2014

Related U.S. Application Data

(60) Provisional application No. 61/933,686, filed on Jan. 30, 2014.

(51) Int. Cl.
| | |
|---|---|
| G06F 13/12 | (2006.01) |
| G06F 13/38 | (2006.01) |
| G06F 13/40 | (2006.01) |
| G06F 13/10 | (2006.01) |

(52) U.S. Cl.
CPC ........... *G06F 13/4068* (2013.01); *G06F 13/10* (2013.01)

(58) Field of Classification Search
None
See application file for complete search history.

(56) References Cited

U.S. PATENT DOCUMENTS 7,080,189 B1 * 7/2006 Luttmann ............. G06F 13/426
  710/313
8,078,805 B1 * 12/2011 Smirnov ............... G06F 13/102
  711/103
2013/0262708 A1   10/2013 McLeod
2014/0164648 A1    6/2014 Barber et al.

OTHER PUBLICATIONS

T. Hirofuchi et al., "USB/IP—A Peripheral Bust Extension for Device Sharing Over IP Network", USENIX Association, FREENIX Track: 2005 USENIX Annual Technical Conference, pp. 47-60.
R. Van Meter et al., "VISA: Netstation's Virtual Internet SCSI Adapter", ACM SIGOPS Operating System Review, 32 (5), Dec. 1998, pp. 71-80.
J. Satran et al., "Internet Small Computer Systems Interface (iSCSI)", Standards Track, RFC3720, Apr. 2004, 240 pgs.

(Continued)

*Primary Examiner* — David E Martinez
(74) *Attorney, Agent, or Firm* — Moser Taboada

(57) ABSTRACT

A method and apparatus for communicating USB data. In one embodiment, the method comprises receiving, by an optimizer executing on a computer and communicatively coupled between a USB storage driver (USBSD) and a USB hub controller driver (UHCD), an SCSI command; transmitting, by the optimizer in response to receiving the SCSI command, the SCSI command to the UHCD; generating, by the optimizer, an SCSI command completion; transmitting, by the optimizer, the SCSI command completion to the USBSD; receiving, by the optimizer, SCSI data associated with the SCSI command completion; transmitting, by the optimizer in response to receiving the SCSI data, the SCSI data to the UHCD; generating, by the optimizer after transmitting the SCSI data, an optimized SCSI status message; transmitting, by the optimizer, the optimized SCSI status message to the UHCD; and transmitting, by the optimizer responsive to an SCSI status completion, the SCSI Status completion to the USBSD.

17 Claims, 7 Drawing Sheets

(56) References Cited

OTHER PUBLICATIONS

Meter et al., "VISA: Netstation's Virtual Internet SCSI Adapter. ACM SIGOPS Operating System Review", vol. 32, Issue 5, pp. 71-80, Dec. 1998.

Satran et al., "Internet Small Computer Systems Interface (iSCSI). RFC3720", Apr. 2004.

Hirofuchi et al., "USB/IP—a Peripheral Bus Extension for Device Sharing over IP Network", Nara Institute of Science and Technology, Ikomo, Japan, FREENIX Track: 2005 USENIX Annual Technical Conference, pp. 47-60, 2005.

\* cited by examiner

APPARATUS AND METHOD FOR OPTIMIZING USB-OVER-IP DATA TRANSACTIONS

CROSS-REFERENCE TO RELATED APPLICATIONS

This application claims benefit of U.S. Provisional Patent Application 61/933,686 entitled "Apparatus and Method for Optimizing USB-over-IP Transactions", filed Jan. 30, 2014, herein incorporated in its entirety by reference.

BACKGROUND OF THE INVENTION

1. Field of the Invention

Embodiments of the present invention relate generally to a method and apparatus for optimizing bulk data transactions for mass storage devices used with USB-over-IP systems.

2. Description of the Related Art

In the 2005 USENIX paper entitled "USB/IP—a Peripheral Bus Extension for Device Sharing over IP Network", Hirofuchi proposes USB/IP as a peripheral bus extension over an Internet Protocol (IP) network. This device sharing approach is based on the peripheral interfaces that are supported in most modern operating systems. Using a virtual peripheral bus driver, users can share a range of devices over networks without any modification in existing operating systems and applications. The problem with USB/IP as an underlying communications layer for single issue data transfer protocols such as Small Computer Systems Interface (SCSI) is that data throughput is severely impeded by round trip network delays which may be particularly problematic in high latency wide area network applications.

Therefore, there is a need in the art for efficient data transfer, in particular over high latency networks, using USB/IP.

SUMMARY OF THE INVENTION

Embodiments of the present invention generally relate to a method and apparatus for communicating Universal Serial Bus (USB) data as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A common problem with existing Universal Serial Bus (USB) over Internet Protocol (IP) 'USB-over-IP', alternatively termed "remoted USB" implementations is the decreased throughput of Bulk Only Transport (BOT) associated with mass storage devices over high latency network connections. This problem is due to the Windows mass storage driver (named 'usbstor.sys' and alternatively referred herein as 'USBStor' or 'USB storage driver') issuing USB BOT requests (in the form of USB request blocks (URBs)) in a single-issue manner; i.e., USBStor waits for each request to be completed before issuing the next request, resulting in a maximum of one outstanding request at any time. According to one or more embodiments described herein, a BOT Optimizer installed as a Windows Filter Driver between usbstor.sys and underlying USB hub software increases the throughput of USB bulk data transfers by rationalizing selective BOT Requests and corresponding completion messages between USBStor and the USB hub software.

In one or more embodiments using BOT for mass storage devices, this rationalization reduces the three sequential round trip delays associated with Small Computer Systems Interface (SCSI) command, data and status messages to a single round trip delay. Because the USBStor driver is generally assigned to each USB mass storage device enumerated by the operating system, it can be assured that every USB mass storage device will benefit from the optimized BOT transactions.

Figure 1:
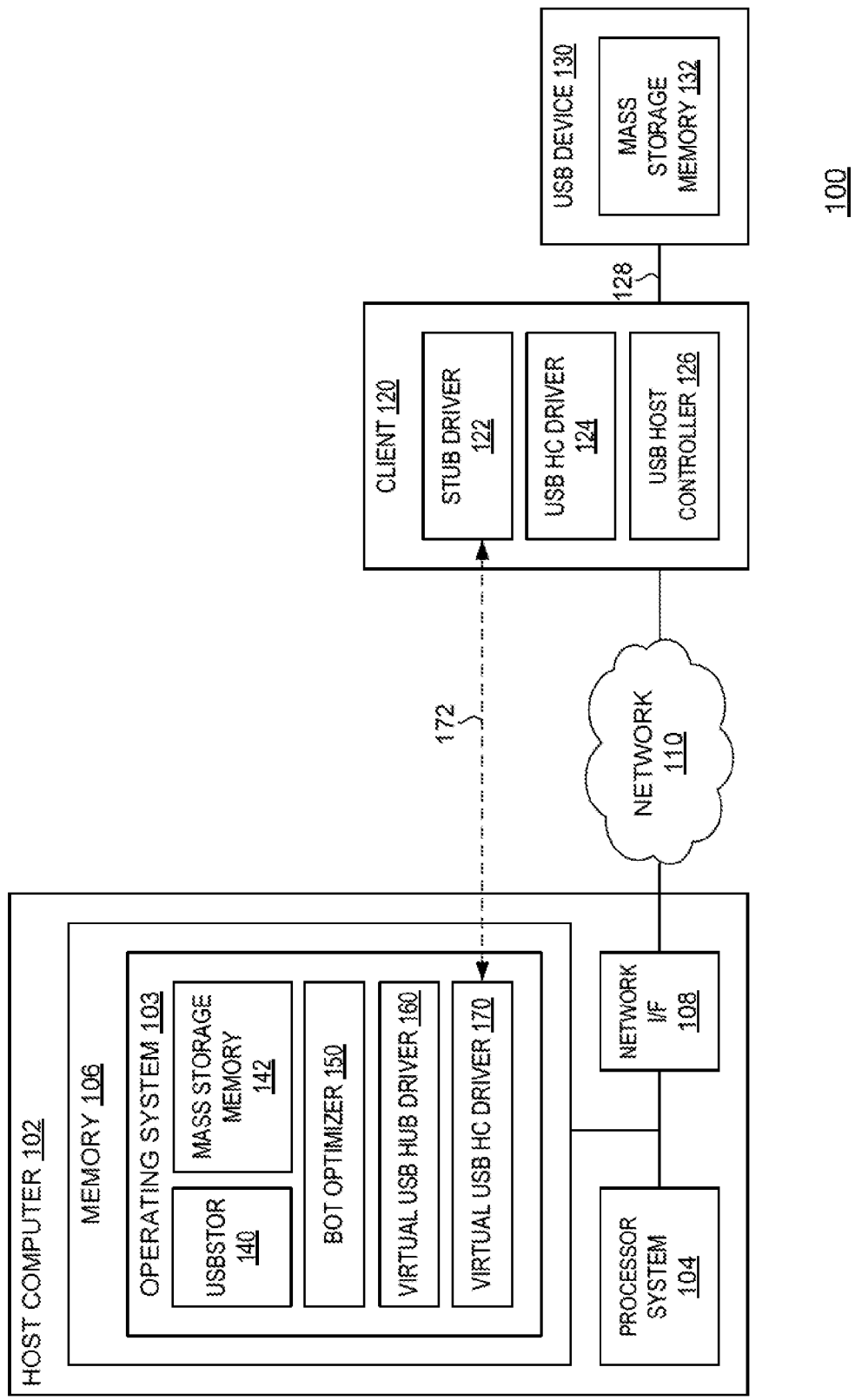
FIG. 1 illustrates selected details of an embodiment of a USB-over-IP system comprising bulk transfer (BT) Optimizer software.

FIG. 1 illustrates selected details of an embodiment of a networked client-host system 100 ("system 100") comprising a client 120 communicatively coupled to a host computer 102 via a network 110.

The host computer 102 generally comprises a server or workstation hardware platform known to the art, such as an enterprise or cloud-based server from manufacturers such as HP, Cisco or IBM, or a workstation computer, enabled to execute well-known operating system software (e.g., one or more instances of Microsoft Windows operating system software) shown as operating system (OS) 103 (which may also be referred to as OS domain 103), optionally in conjunction with hypervisor software known to the art (e.g., ESX, Hyper-V or XenServer Hypervisor products from VMware, Microsoft or Citrix Corporations respectively), typically located in memory 106. The host computer 102 may also comprise application software services (such as Microsoft Terminal Services (TS)) or software (such as "View Agent" from VMware) enabled to provide remote access to individual desktops and/or applications, such as word processing software, spreadsheets, financial data presentation, video or photo display or editing software, graphics software such as Computer Aided Design (CAD) software, Desktop Publishing (DTP) software, digital signage software, or the like, via TS or Virtualized Desktop Infrastructure (VDI).

The host computer 102 further comprises a processor system 104 and a network interface 108, both coupled to the memory 106. The processor system 104 typically comprises one or more central processing units (CPUs), optionally one or more graphical processing units (GPUs) or a combination of CPU and GPU processing elements. Examples of a well-known suitable CPU include workstation or server class processors such as 32-bit, 64-bit, or other CPUs including XEON or OPTERON class microprocessors manufactured by INTEL and AMD Corporations respectively. However, any other microprocessor platform designed to perform the data processing methods described herein may be utilized. The memory 106 comprises any one or combination of computer readable and/or writable media e.g., random access memory (RAM), read only memory (ROM), hard drive, SSD drive, tape, CDROM, DVDROM, magneto-optical disks and the like.

The network interface 108, coupled to the network 110, provides compatibility with the network 110 and delivers services including Internet Protocol (IP) and Transmission Control Protocol (TCP) and/or unreliable datagram services such as User Datagram Protocol (UDP) services. The network 110 comprises a communication system (e.g., the Internet, LAN, Wide Area Network (WAN), and the like) that utilizes common network addressing (i.e., combination of IP addresses and port numbers) that connects computer systems completely by wire, cable, fiber optic, and/or wireless links facilitated by various types of well-known network elements, such as Domain Name System (DNS) servers, Certificate Authorities (CA), Network Address Translation (NAT) gateways, hubs, switches, routers, firewalls, and the like.

Client 120 is a remote terminal in a networked computer system such as a desktop, laptop, thin client or zero client computer but in various embodiments client 120 may comprise any form of computing device enabled by a processor and support circuitry to execute the functions of a stub driver 122 and a USB Host Controller Driver (UHCD) 124 which are generally known to the art and connect to a USB device 130 by a USB host controller 126 and a USB bus 128. The USB device is a device such as a USB storage device enabled for USB BOT (i.e., a device supporting the USB mass storage class) and comprises mass storage memory 132.

The OS 103 of the host computer 102 comprises a Windows mass storage driver USBStor 140, a mass storage memory 142 and a BOT optimizer 150. The USBStor 140 is known to the art and implements a BOT transaction protocol comprising SCSI transactions initiated over USB to read and/or write data between allocated mass storage memory 142 and the mass storage memory 132 of USB device 130. The OS 103 of the host computer 102 further comprises a Virtual USB Hub Driver (VUHD) 160, typically comprising usbhub.sys in many versions of Microsoft Windows operating system and a Virtual USB Host Controller (VUHCD) Driver 170, typically comprising uhcd.sys known to the art which communicates URB requests encapsulating outbound BOT messages over the network 110 to the stub driver 122 and on to the UHCD driver 124. In some embodiments, VUHCD 170 is substituted with a user mode process of the operating system 103 that communicates with stub driver 122. The VUHCD 170 receives URB responses comprising inbound BOT messages from the UHCD 124. The configuration of the system 100 ensures that the BOT optimizer 150 is communicatively coupled between a storage driver (i.e., the USBStor driver 140) and the UHCD 124; i.e., the BOT Optimizer 150 is communicatively coupled to VUHCD 170 via hub driver 160, VUHCD 170 is communicatively coupled to stub driver 122 using logical link 172 of IP network 110, stub driver 122 is communicatively coupled to UHCD 124 and UHCD 124 is communicatively coupled to USB storage device 130 via USB host controller 126 and USB bus 128. The VUHCD 170 (or equivalent user mode process) and the stub driver 122 use link 172 to communicate URBs between the BOT optimizer 150 and the UHCD 124.

In an embodiment, the BOT optimizer 150 is communicatively coupled between the USBStor 140 and the usbhub.sys of the VUHD 160. In particular, the BOT optimizer 150 may be configured as a filter driver between a Microsoft Windows storage device functional device object (FDO) created by the USBStor 140 and a Microsoft Windows storage device physical device object (PDO) created by the usbhub.sys of the VUHD 160. The storage device PDO then communicates with the underlying device stack of the USB root hub. In some embodiments, the BOT optimizer 150 is installed from media (e.g., executable installation media provided on CDROM or over the Internet) without any requirement to update or modify other software in the memory 106 such as the previously installed VUHD 160 or VUHCD 170. In other embodiments, the BOT optimizer 150 is integrated with a variation of the USBStor 140, the VUHD 160 or the VUHCD 170.

Figure 2:
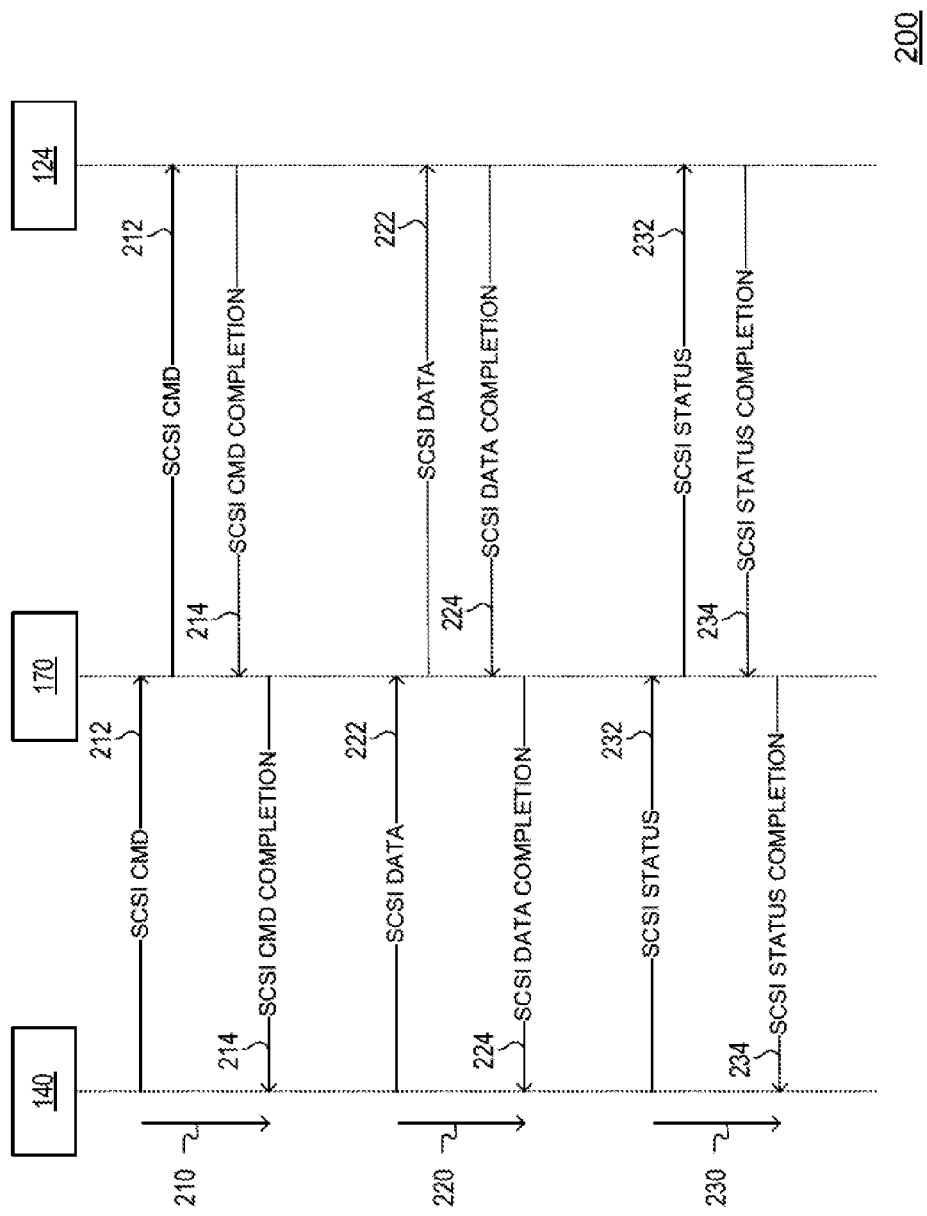
FIG. 2 illustrates a transaction sequence for a conventional USB-over-IP system.

FIG. 2 depicts a background art transaction sequence 200 which illustrates how SCSI commands associated with the BOT protocol are generally broken into either two or three USB bulk transfer requests, thereby incurring two or three Round Trip Time (RTT) delays. Firstly, RTT 210 is associated with the command (CMD) message 212 in an OUT direction from the USBStor driver 140 to the VUHCD 170, across the network 110 to client UHCD 124 and associated CMD completion message 214 in the opposite direction. Secondly, RTT 220 is associated with the SCSI data message 222 (which may be IN or OUT) from the USBStor driver 140 to the client UHCD 124 and corresponding data completion message 224 in the opposite direction. SCSI data message 222 and corresponding data completion message 224 may be omitted entirely for select SCSI commands. Finally, the RTT 230 is associated with the SCSI status message 232 from the USBStor driver 140 to the client UHCD 124 and corresponding status completion message 234 in the opposite direction. The status is always in an inbound direction from the UHCD 124 to the USBStor driver 140.

Figure 3:
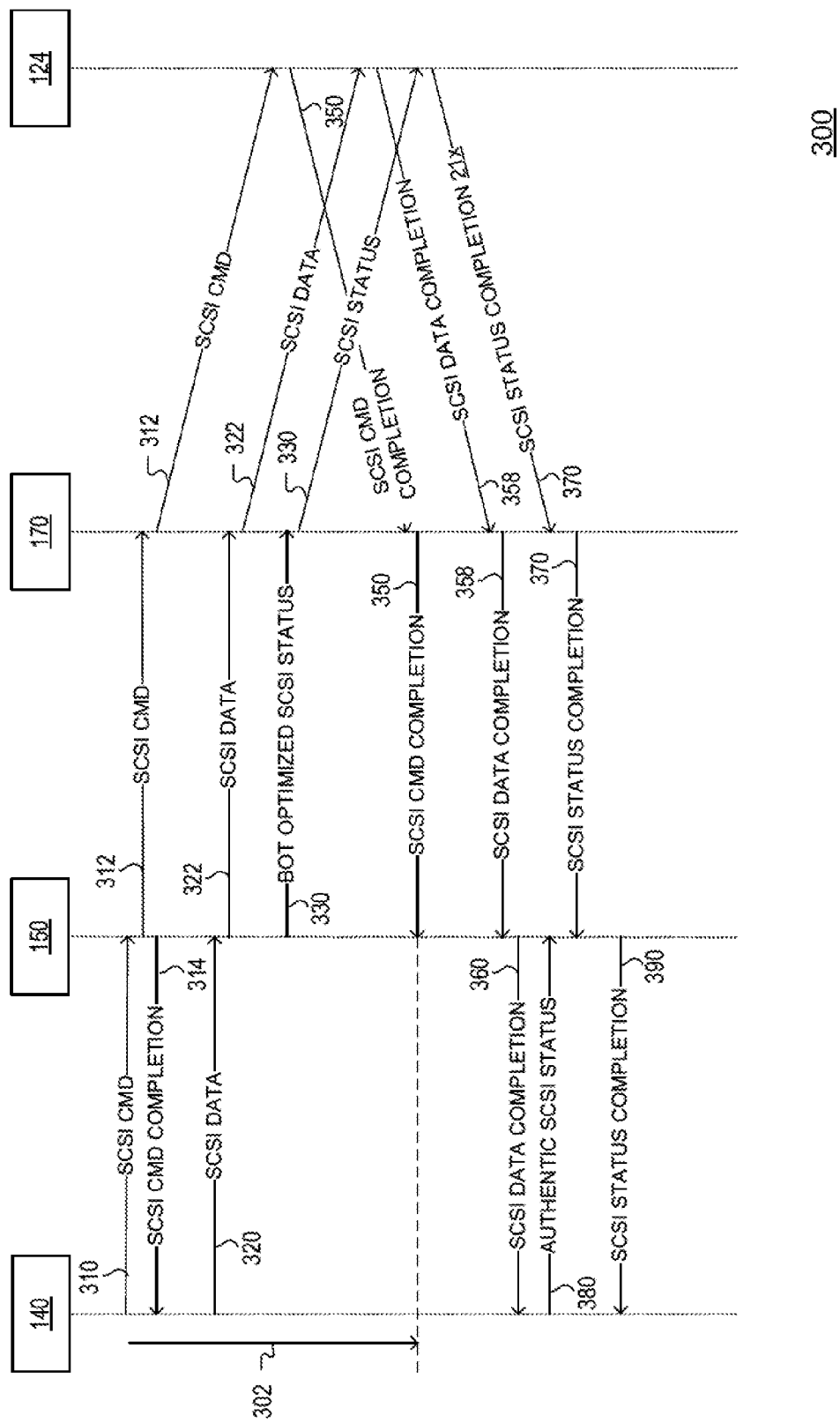
FIG. 3 illustrates a transaction sequence for a USB-over-IP system comprising a bulk transfer optimizer.

FIG. 3 depicts a transaction sequence 300 in accordance with one or more embodiments of the present invention. The transaction sequence 300 depicts the RTT reduction from the multiple RTTs of FIG. 2 to a single RTT 302 due to the BOT optimizer 150 installed below the USBStor 140 and above the VUHD 160. The BOT optimizer 150 hooks BOT messages from IO Request Packets (IRP) flowing up and down the stack and processes them according to method 400 described herein.

The transaction sequence 300 begins with an SCSI command message 310 issued from the USBStor 140 and intercepted by the BOT optimizer 150. When the BOT optimizer 150 intercepts the SCSI command message 310, it transmits the SCSI command message 310 as the SCSI command message 312 down the stack to the VUHCD 170. Additionally, the SCSI command message 310 is also completed as a BOT-optimized command completion when the BOT optimizer 150 sends the SCSI CMD completion message 314 to the USBStor 140. The SCSI command completion message 350 (i.e. completion of the SCSI command associated with SCSI command message 312), sent from the VUHCD 170 and received by the BOT optimizer 150 at a later time, is consumed by the BOT optimizer 150.

The SCSI CMD completion message 314, transmitted from the BOT optimizer 150 to the USBStor 140, prompts the USBStor 140 to issue the SCSI data message 320. The BOT optimizer 150 passes the unmodified SCSI data message 320 down the stack to the VUHCD 170 as the SCSI data message 322, which is later returned from the VUHCD 170 to the BOT optimizer 150 as the SCSI data completion message 358. The BOT optimizer 150 generates the SCSI data completion message 360 which is transmitted to the USBStor 140.

Following the reception of the SCSI data message 320, the BOT optimizer 150 self-generates the BOT-optimized SCSI status message 330 which is communicated down the stack to the VUHCD 170. The completion of the BOT-optimized SCSI status message 330 (i.e., the SCSI status completion message 370 transmitted from the VUHCD 170 to the BOT optimizer 150) is used by the BOT optimizer 150 as response to the authentic SCSI status message 380 that it receives from the USBStor 140 and which gets discarded (i.e., message 380 is an SCSI status request message that gets discarded by BOT optimizer 150). The BOT optimizer 150 completes the authentic SCSI status request by providing the SCSI status completion message 370 to the USBStor 140 as the SCSI status completion 390. The BOT optimizer 150 transmits the SCSI status completion message 390 to the USBStor 140 in response to the authentic SCSI status message 380, which is issued by the USBStor 140 on receipt of the SCSI data completion message 360.

The transaction sequence 300 results in all three messages—i.e., the SCSI CMD message 310, the SCSI data message 320, and the authentic SCSI status message 380—going down the stack and across the network 110 to the client 120 in quick succession, and the system 100 experiences a single RTT latency 302 per SCSI command rather than one RTT latency penalty for each USB bulk transfer transaction. In an embodiment comprising a high-latency connection, the RTT latency without the use of BOT optimizer 150 is likely one or more orders of magnitude larger than the aggregate of other system processing delays. The maximum theoretical performance improvement with BOT optimizer 150 is threefold. Note that in an embodiment, various messages including the SCSI command 312, the SCSI data 322, the BOT optimized SCSI status 330 and the authentic SCSI status message 380 comprise SCSI messages encapsulated as URB data structures.

Figure 4:
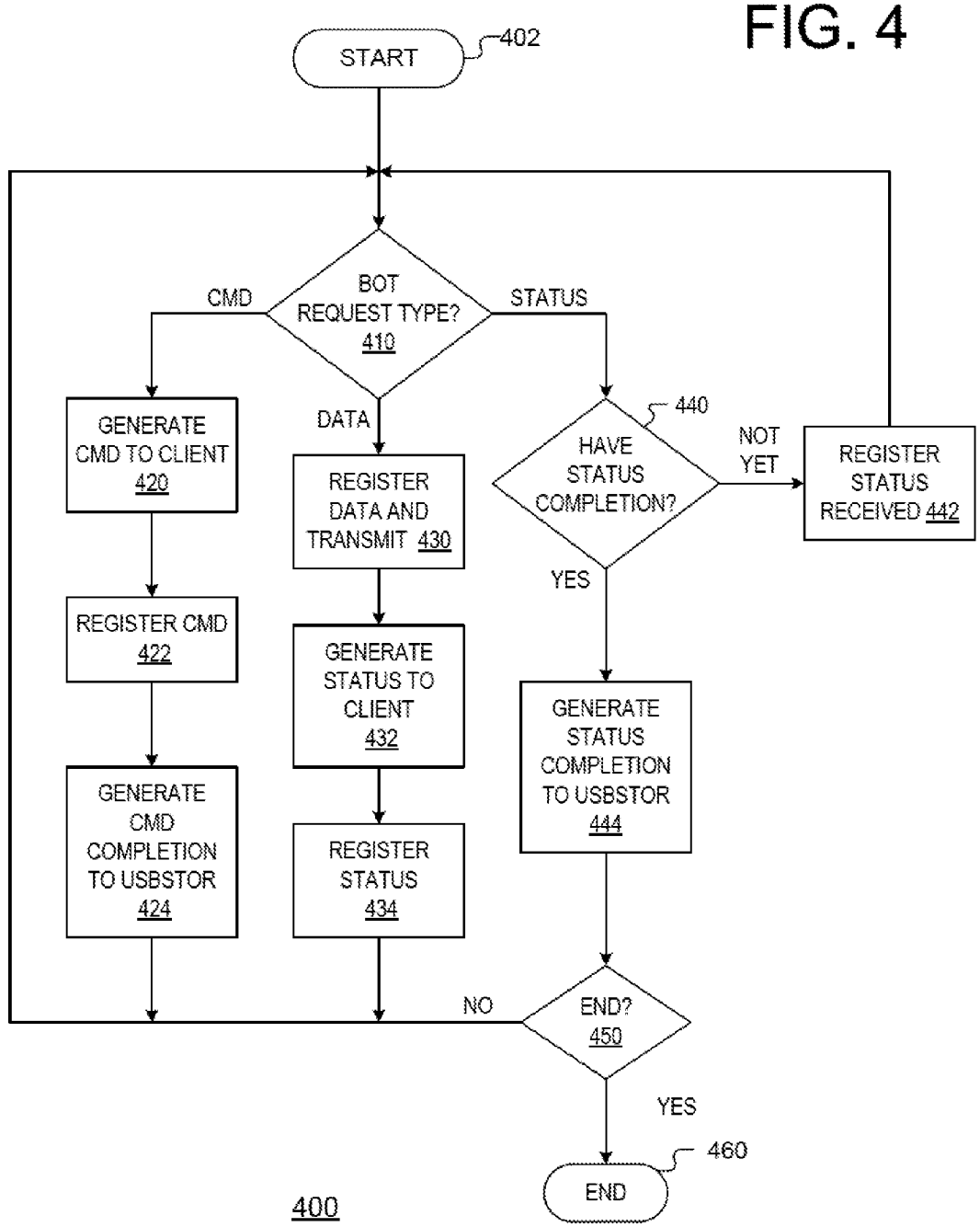
FIG. 4 illustrates a method for sequencing a USB bulk only transport (BOT) transaction in accordance with the type of BOT request received from USBstor driver software.

FIG. 4 illustrates a method 400 for processing mass storage device BOT messages received by the BOT optimizer 150 from the USBStor 140 in accordance with one or more embodiments of the present invention. The method 400 represents one embodiment of an implementation of the BOT optimizer 150. The method 400 starts at step 402 and proceeds to step 410 ("BOT Request Type?") where BOT messages are evaluated to determine the type of BOT request. Non-BOT messages such as plug and play IRPs, power management IRPs and internal device control IRPs are generally managed outside of the method 400 using conventional techniques.

If at step 410 it is determined that the BOT message is the SCSI command 310, the method 400 proceeds to step 420 ("Generate CMD to Client") in which the SCSI command 312) (i.e., the SCSI command 310) is passed down the stack to the VUHCD 170. As a next step 422 ("register CMD"), the SCSI command is registered by the BOT optimizer 150 (e.g. in the form of a callback function) so that the anticipated corresponding command completion message (e.g., the SCSI CMD completion 350) can be processed by the BOT optimizer 150 when received (ref. method 500 described below). As a next step 424 ("Generate CMD Completion to USBStor"), the SCSI command completion message 314 is generated by the BOT optimizer 150 and communicated up the stack to the USBStor 140, following which the method 400 returns to step 410.

If at step 410 it is determined that the BOT message is the SCSI data message 320, the method 400 proceeds, to step 430 ("Register Data and Transmit") in which a monitor (e.g., a callback function) is configured to respond to the corresponding SCSI data completion message 358 expected from the client and SCSI data message 322 is passed down the stack to the VUHCD 170. The processing of the SCSI data completion message 358 is described below with respect to the method 700. The method 400 proceeds to step 432 ("Generate Status to Client") in which a BOT-optimized SCSI status message 330 is generated and communicated down the stack. At step 434 ("Register Status") the BOT optimizer 150 is configured to respond to the corresponding SCSI status completion message 370 expected from the client, following which method 400 returns to step 410.

If at step 410 it is determined that the BOT message is the authentic SCSI status message 380, the method 400 proceeds to step 440 ("Have Status Completion?"). If at step 440 it is determined that the SCSI status completion 370) has not yet been received, the method 400 proceeds to step 442 in which the BOT optimizer 150 registers the authentic SCSI status message 380 and returns to step 410. The processing of the SCSI status completion 370 received by the BOT optimizer 150 is described below in the method 600. If at step 440 it is determined that the SCSI status completion 370 is registered as previously received, the method 400 proceeds to step 444 ("Generate Status Completion to USBStor") in which the SCSI status completion message 390 is generated and communicated up the stack to the USBStor 140.

The method 400 proceeds from step 444 to step 450 ("End"), following which the method 400 either returns to step 410 to wait for the next SCSI command or ends at step 460, for example following the disconnection of the device 130.

Figure 5:
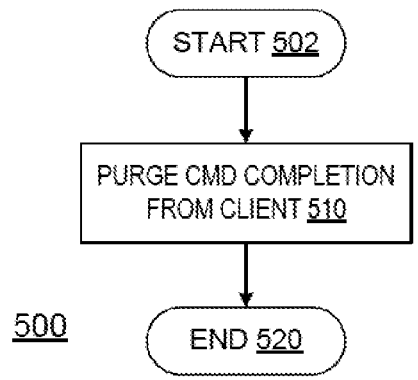
FIG. 5 illustrates a method for processing a command completion message received from a client.

FIG. 5 illustrates a method 500 for processing command completion messages (ref. message 350 of FIG. 3) received by the BOT optimizer 150 from the VUHCD 170 in accordance with one or more embodiments of the present invention. The method 500 represents one embodiment of an implementation of the BOT optimizer 150. The method 500 starts at step 502 and proceeds to step 510 ("Purge CMD Completion from Client") in which SCSI command completion messages associated with previously registered SCSI commands (ref. step 422 of the method 400) are consumed by the BOT optimizer 150 because the SCSI command completion 314 has already been generated by the BOT optimizer 150 and communicated up the stack to the USBStor 140. The method 500 then ends at step 520 ("End").

Figure 6:
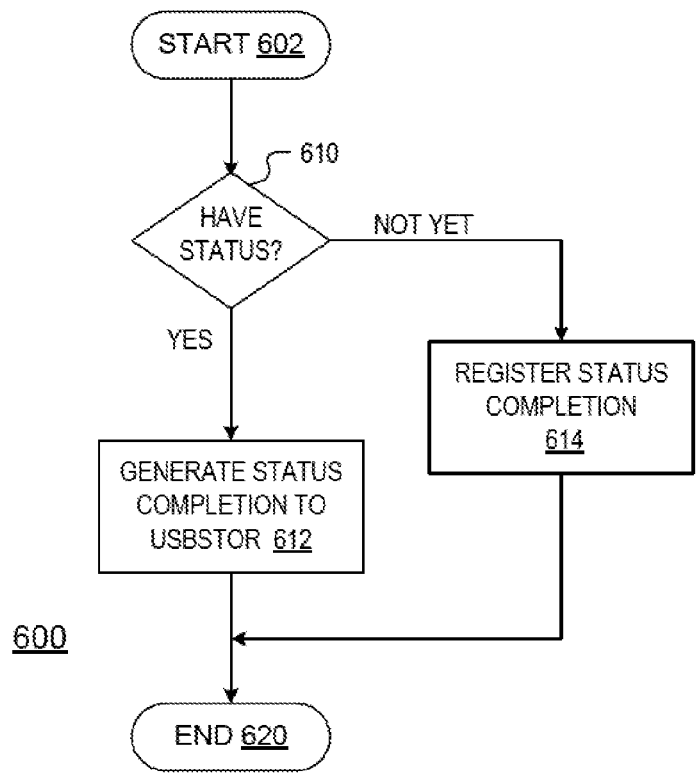
FIG. 6 illustrates a method for processing a status completion message received from a client.

FIG. 6 illustrates a method 600 for processing SCSI status completion messages (ref. message 370 of FIG. 3) received by the BOT optimizer 150 from the VUHCD 170 in accordance with one or more embodiments of the present invention. The method 600 represents one embodiment of an implementation of the BOT optimizer 150. The method 600 starts at step 602 and proceeds to step 610 ("Have Status?"). If at step 610 it is determined that the authentic SCSI status message 380 has not yet been received, the method 600 proceeds to step 614 ("Register Status Completion") in which the SCSI completion message 370 is registered by the BOT optimizer 150 and the method 600 ends at step 620. If at step 610 it is determined that the authentic SCSI status message 380 has been received (ref. step 442 of the method 400), the method 600 proceeds from step 610 to step 612 ("Generate Status Completion to USBStor") in which the SCSI status completion message 390 is generated and communicated up the stack to the USBStor 140, following which the method 600 ends at step 620.

Figure 7:
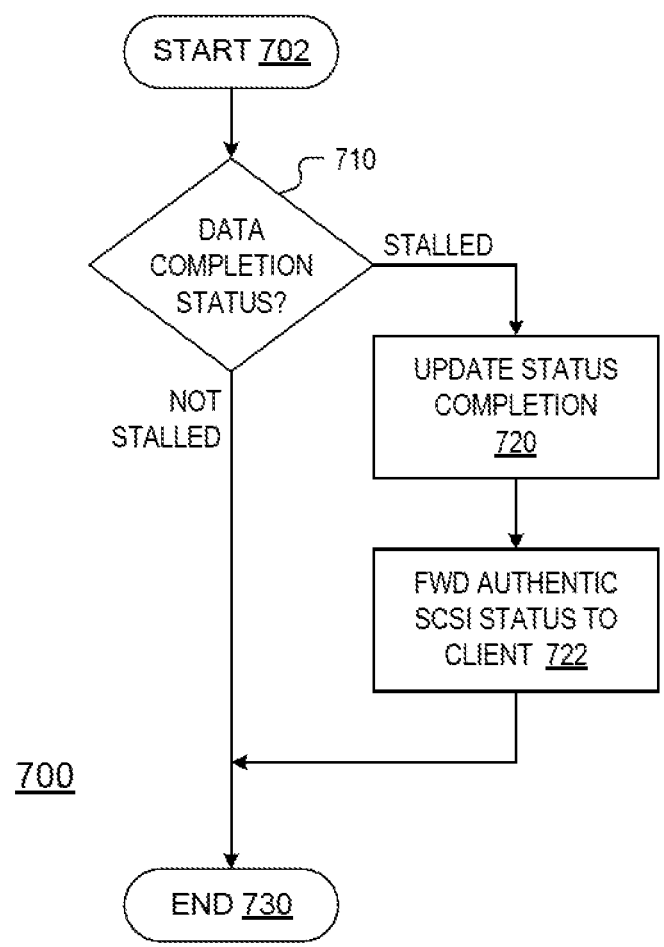
FIG. 7 illustrates a method for processing a data completion message received from a virtual USB host controller driver.

FIG. 7 illustrates a method 700 for processing SCSI data completion messages (ref. message 358 of FIG. 3) received by the BOT optimizer 150 from the VUHCD 170 in accordance with one or more embodiments of the present invention. The method 700 starts at step 702 and proceeds to step 710 ("Data Completion Status?"). If at step 710 it is determined that the data completion is stalled (e.g. a URB level stall status), the method 700 proceeds to step 720 ("Update Status Completion"), in which a flag is set to indicate that the SCSI completion message 370 should be ignored and that the authentic SCSI status message 380 should be passed to the client 120 once received by the BOT optimizer 150. Generally the USBStor 140 responds to a stall by resetting the data path to clear the stall. Thereafter, an authentic SCSI status message 380 is generated by the USBStor 140 which is forwarded by the BOT optimizer 150 to the client 120 at step 722 ("Fwd Authentic SCSI Status to Client"). The method 700 proceeds from step 722 to step 730 ("End").

If, at step 710, it is determined that the data completion is not stalled, the method 700 proceeds to step 730 where it ends.

Figure 8:
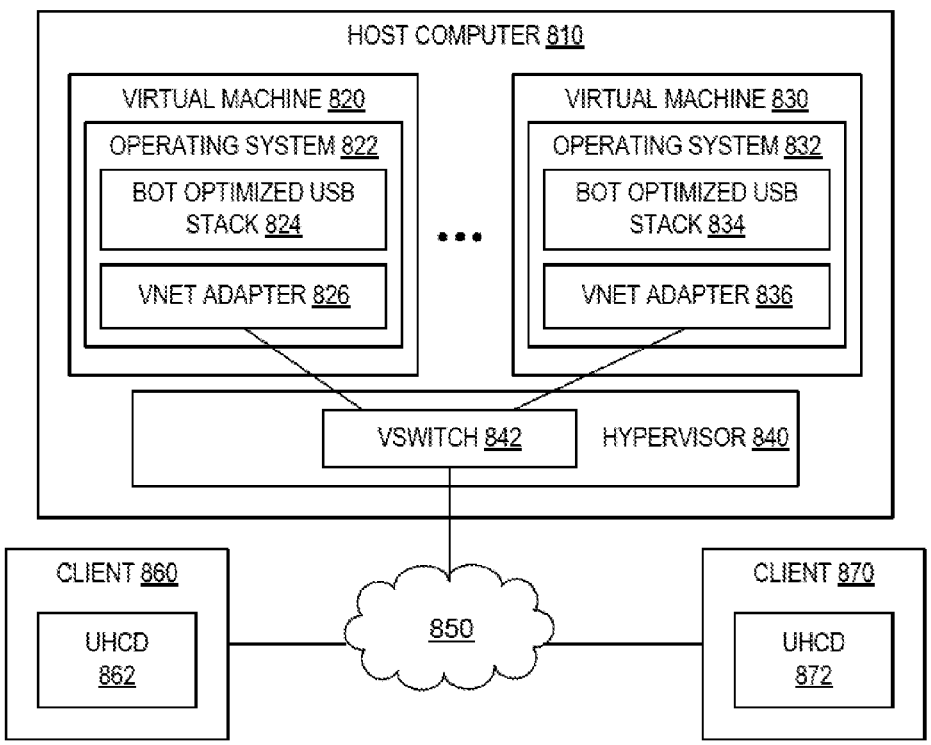
FIG. 8 illustrates a system comprising a host computer having a plurality of BOT optimized virtual machines.

FIG. 8 illustrates a system 800 comprising a host computer 810 which is an alternative embodiment of host computer 102 that hosts a plurality of operating systems. Host computer 810 has a plurality of virtual machines (VMs), where each VM comprises a BOT-optimized USB stack in accordance with one or more embodiments of the present invention. The host computer 810 comprises at least a VM 820 and a VM 830 executed under control of a hypervisor 840. Each VM 820 and 830 comprises an operating system domain (shown as an operating system 822 and an operating system 832), where each operating system 822 and 832 executes a BOT-optimized USB stack (shown as a BOT-optimized USB stack 824 and a BOT-optimized USB stack 834, respectively). Each BOT-optimized USB stack 824 and 834 comprises at least i) a BOT optimizer 150 (i.e., the VMs 820 and 830 each execute an instance of the BOT optimizer 150), ii) a VUHD 160 and iii) a VUHCD 170.

Each VM 820 and 830 is coupled to a client computer via a virtual network adapter (e.g. a vmxnet Ethernet Adapter from VMWARE Corporation), a virtual switch and an IP network 850. In the embodiment depicted in FIG. 8, the BOT-optimized USB stack 824 of the VM 820 is communicatively coupled to a UHCD 862 of a client computer 860 via a virtual network adapter 826 of the operating system 822 and a virtual switch 842 of the hypervisor 840 (i.e., the VUHCD 170 of the BOT-optimized USB stack 824 is coupled to the IP network 850 via the virtual network adapter 826 and the virtual switch 842). Additionally in the embodiment depicted in FIG. 8, the BOT-optimized USB stack 834 of the VM 830 is communicatively coupled to a UHCD 872 of a client computer 870 via a virtual network adapter 836 of the operating system 832 and the virtual switch 842 (i.e., the VUHCD 170 of the BOT-optimized USB stack 834 is coupled to the IP network 850 via the virtual network adapter 836 and the virtual switch 842). The BOT optimizer 150 of BOT-optimized USB stack 824 reduces the round trip message delays between a USB storage driver of VM 820 and client 860 by executing the steps of method 400 described above. The BOT optimizer 150 of BOT-optimized USB stack 834 reduces the round trip message delays between a USB storage driver of VM 830 and client 870 by executing the steps of method 400 described above.

Figure 9:
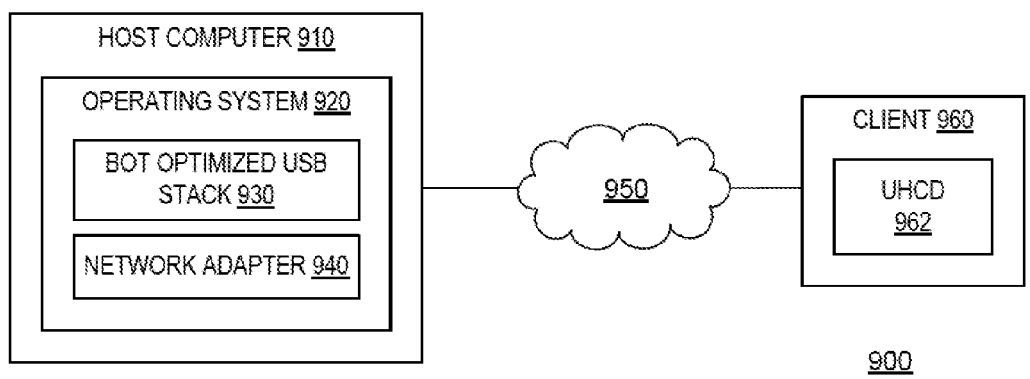
FIG. 9 illustrates a system comprising a host computer such as a workstation having a BOT-optimized USB stack.

FIG. 9 illustrates a system 900 comprising a host computer 910 which is an embodiment of host computer 102 that hosts a native operating system such as a Microsoft Windows-based workstation or business computer, having a BOT-optimized USB stack in accordance with one or more embodiments of the present invention. The host computer 910 comprises an operating system 920 executing a BOT-optimized USB stack 930 that comprises at least a BOT optimizer 150, a VUHD 160 and a VUHCD 170. The host computer 910 is coupled to a client computer 960 via a network adapter 940 and an IP network 950. The network adapter 940 is typically native to the operating system 920 and compatible with network interface hardware of the host computer 910 (e.g., a Gigabit Ethernet adapter from INTEL Corporation). In an embodiment, the BOT-optimized USB stack 930 of the operating system 920 is communicatively coupled to a UHCD 962 of the client computer 960 via the network adapter 940 (i.e., the VUHCD 170 of the BOT-optimized USB stack 930 is coupled to the IP network 950 via the network adapter 940). The BOT optimizer 150 of BOT-optimized USB stack 930 reduces the round trip message delays between a USB storage driver of host computer 910 and client 960 by executing the steps of method 400 previously described.

While the foregoing is directed to embodiments of the present invention, other and further embodiments of the invention may be devised without departing from the basic scope thereof, and the scope thereof is determined by the claims that follow.

The invention claimed is:

1. A method of communicating Universal Serial Bus (USB) data, comprising:
receiving, by an optimizer executing on a computer and communicatively coupled between a USB storage driver and a USB hub controller driver (UHCD), a small computer systems interface (SCSI) command;
transmitting, by the optimizer in response to receiving the SCSI command, the SCSI command to the UHCD;
generating, by the optimizer, an SCSI command completion;
transmitting, by the optimizer, the SCSI command completion to the USB storage driver;
receiving, by the optimizer, SCSI data associated with the SCSI command completion;
transmitting, by the optimizer in response to receiving the SCSI data, the SCSI data to the UHCD;
generating, by the optimizer subsequent to transmitting the SCSI data, an optimized SCSI status message;
transmitting, by the optimizer, the optimized SCSI status message to the UHCD;
transmitting, by the optimizer in response to receiving an SCSI status completion, the SCSI Status completion to the USB storage driver; and discarding, by the optimizer, (i) an SCSI command completion received from the UHCD and (ii) an authentic SCSI status message received from the USB storage driver.

2. The method of claim 1, wherein communicatively coupling the optimizer to the UHCD comprises (i) communicatively coupling the optimizer to a virtual UHCD, (ii) communicatively coupling the UHCD to a stub driver and (ii) communicatively coupling the virtual UHCD to the stub driver via an Internet Protocol (IP) network; and wherein the UHCD is communicatively coupled to a USB storage device via a USB host controller.

3. The method of claim 2, wherein the virtual UHCD and the stub driver communicate USB request blocks (URBs) between the optimizer and the UHCD.

4. The method of claim 2, wherein the USB storage driver, the optimizer and the virtual UHCD execute in a single operating system (OS) domain; and wherein the virtual UHCD is communicatively coupled to the UHCD via the IP network.

5. The method of claim 4, wherein the OS domain operates in one of a plurality of virtual machines executing on the computer, and wherein each of the plurality of virtual machines (a) executes an instance of the optimizer and (b) is coupled to one of a plurality of client computers, each client computer comprising an instance of the UHCD.

6. The method of claim 4 wherein the virtual UHCD is communicatively coupled to the IP network using a virtualized network adapter in the OS domain.

7. The method of claim 4 wherein the virtual UHCD is communicatively coupled to the IP network using a network adapter native to the OS domain.

8. The method of claim 1, wherein the SCSI command, the SCSI data, the optimized SCSI status message and the authentic SCSI status message are USB request block (URB) data structures.

9. An apparatus for communicating Universal Serial Bus (USB) data, comprising:
an optimizer, executing on a computer and communicatively coupled between a USB storage driver and a USB hub controller driver (UHCD), for:
receiving a small computer systems interface (SCSI) command;
transmitting, in response to receiving the SCSI command, the SCSI command to the UHCD;
generating an SCSI command completion;
transmitting the SCSI command completion to the USB storage driver;
receiving SCSI data associated with the SCSI command completion;
transmitting, in response to receiving the SCSI data, the SCSI data to the UHCD;
generating, subsequent to transmitting the SCSI data, an optimized SCSI status message;
transmitting the optimized SCSI status message to the UHCD;
transmitting, in response to receiving an SCSI status completion, the SCSI Status completion to the USB storage driver; and
discards (i) an SCSI command completion received from the UHCD and (ii) an authentic SCSI status message received from the USB storage driver.

10. The apparatus of claim 9, wherein communicatively coupling the optimizer to the UHCD comprises (i) communicatively coupling the optimizer to a virtual UHCD, (ii) communicatively coupling the UHCD to a stub driver and (ii) communicatively coupling the virtual UHCD to the stub driver via an Internet Protocol (IP) network; and wherein the UHCD is communicatively coupled to a USB storage device via a USB host controller.

11. The apparatus of claim 10, wherein the virtual UHCD and the stub driver communicate USB request blocks (URBs) between the optimizer and the UHCD.

12. The apparatus of claim 10, wherein the USB storage driver, the optimizer and the virtual UHCD execute in a single operating system (OS) domain; and wherein the virtual UHCD is communicatively coupled to the UHCD via the IP network.

13. The apparatus of claim 12, wherein the OS domain operates in one of a plurality of virtual machines executing on the computer, and wherein each of the plurality of virtual machines (a) executes an instance of the optimizer and (b) is coupled to one of a plurality of client computers, each client computer comprising an instance of the UHCD.

14. The apparatus of claim 12 wherein the virtual UHCD is communicatively coupled to the IP network using a virtualized network adapter in the OS domain.

15. The apparatus of claim 12 wherein the virtual UHCD is communicatively coupled to the IP network using a network adapter native to the OS domain.

16. The apparatus of claim 9, wherein the SCSI command, the SCSI data, the optimized SCSI status message and the authentic SCSI status message are USB request block (URB) data structures.

17. A system for communicating Universal Serial Bus (USB) data, comprising:
a host computer comprising:
an optimizer;
a USB storage driver; and
a USB hub controller driver (UHCD), wherein the optimizer is communicatively coupled between the USB storage driver and the USB hub controller driver (UHCD), and wherein the optimizer:
receives a small computer systems interface (SCSI) command;
transmits, in response to receiving the SCSI command, the SCSI command to the UHCD;
generates an SCSI command completion;
transmits the SCSI command completion to the USB storage driver;
receives SCSI data associated with the SCSI command completion;
transmits, in response to receiving the SCSI data, the SCSI data to the UHCD;
generates, subsequent to transmitting the SCSI data, an optimized SCSI status message;
transmits the optimized SCSI status message to the UHCD;
transmits, in response to receiving an SCSI status completion, the SCSI Status completion to the USB storage driver; and
discarding (i) an SCSI command completion received from the UHCD and (ii) an authentic SCSI status message received from the USB storage driver.

* * * * *